US012595752B2

(12) United States Patent
Lin

(10) Patent No.: US 12,595,752 B2
(45) Date of Patent: Apr. 7, 2026

(54) INTEGRATED POWER GENERATION SYSTEM WITH THERMAL ENERGY AND PRESSURE STORAGE CYCLES AND CONTROLLING METHOD THEREOF

(71) Applicant: Winner Technology Co., Ltd., Toufen City (TW)

(72) Inventor: Chih-Shen Lin, Toufen City (TW)

(73) Assignee: WINNER TECHNOLOGY CO., LTD., Toufen City (TW)

( * ) Notice: Subject to any disclaimer, the term of this patent is extended or adjusted under 35 U.S.C. 154(b) by 129 days.

(21) Appl. No.: 18/564,125

(22) PCT Filed: Jun. 10, 2022

(86) PCT No.: PCT/CN2022/098097
§ 371 (c)(1),
(2) Date: Nov. 27, 2023

(87) PCT Pub. No.: WO2023/000861
PCT Pub. Date: Jan. 26, 2023

(65) Prior Publication Data
US 2024/0263621 A1 Aug. 8, 2024

(30) Foreign Application Priority Data
Jul. 19, 2021 (CN) .......................... 202110811850.X

(51) Int. Cl.
*F01K 3/12* (2006.01)
*F03G 7/06* (2006.01)
(Continued)

(52) U.S. Cl.
CPC ............ *F01K 3/12* (2013.01); *F03G 7/06113* (2021.08); *F28D 20/021* (2013.01); *F28D 2020/0082* (2013.01)

(58) Field of Classification Search
CPC . F01K 3/12; F03G 7/06113; F28D 2020/0082
See application file for complete search history.

(56) References Cited

U.S. PATENT DOCUMENTS

2011/0048408 A1 3/2011 Newman
2012/0227926 A1* 9/2012 Field ...................... F24S 10/95
165/157
(Continued)

FOREIGN PATENT DOCUMENTS

CN 101216020 A 7/2008
CN 101598040 A 12/2009
(Continued)

*Primary Examiner* — Jonathan R Matthias
(74) *Attorney, Agent, or Firm* — MUNCY, GEISSLER, OLDS & LOWE, P.C.

(57) ABSTRACT

This application provides an integrated power generation system with thermal energy and pressure storage cycles comprising a heat and pressure storage unit connected to a heat source, the heat source absorbs and transmits thermal energy to the unit to heat and pressurize a first working substance and convert it to a gaseous state; a first power generation device receives the high-temperature and high-pressure first working substance released from the unit and converts the fluid kinetic energy of the first working substance into electrical energy; a heat storage tank receives the first working substance flowing through the first power generation device for heat exchange and storage of thermal energy; and a cooling tank receives the first working substance from the heat storage tank to enable the first working substance and undergoes a phase change into a liquid state and then transmits it to the unit to complete a cycle.

12 Claims, 10 Drawing Sheets

(51) Int. Cl.
  *F28D 20/02*        (2006.01)
  *F28D 20/00*        (2006.01)

(56)        References Cited

U.S. PATENT DOCUMENTS

2012/0319410  A1*  12/2012  Ambrosek ................ F02C 6/10
                                            290/1 R
2023/0105405  A1*   4/2023  Spadacini ................ F01K 3/12
                                            60/772

FOREIGN PATENT DOCUMENTS

| | | | |
|---|---|---|---|
| CN | 101608606 A | | 12/2009 |
| CN | 105507971 A | | 4/2016 |
| CN | 109869292 A | | 6/2019 |
| JP | 2002048305 A | * | 2/2002 |
| TW | 202037860 A | | 10/2020 |

* cited by examiner (A) Receiving thermal energy from the heat source to enable the first working substance in the heat and pressure storage unit to reach working pressure and temperature which enables the first working substance to be converted into a vaporized first working substance, and controlling the flow of the vaporized first working substance through the first power generation device to reach the heat storage tank, and utilizing the fluid kinetic energy of the vaporized first working substance to drive the first power generation device for power generation;

↓

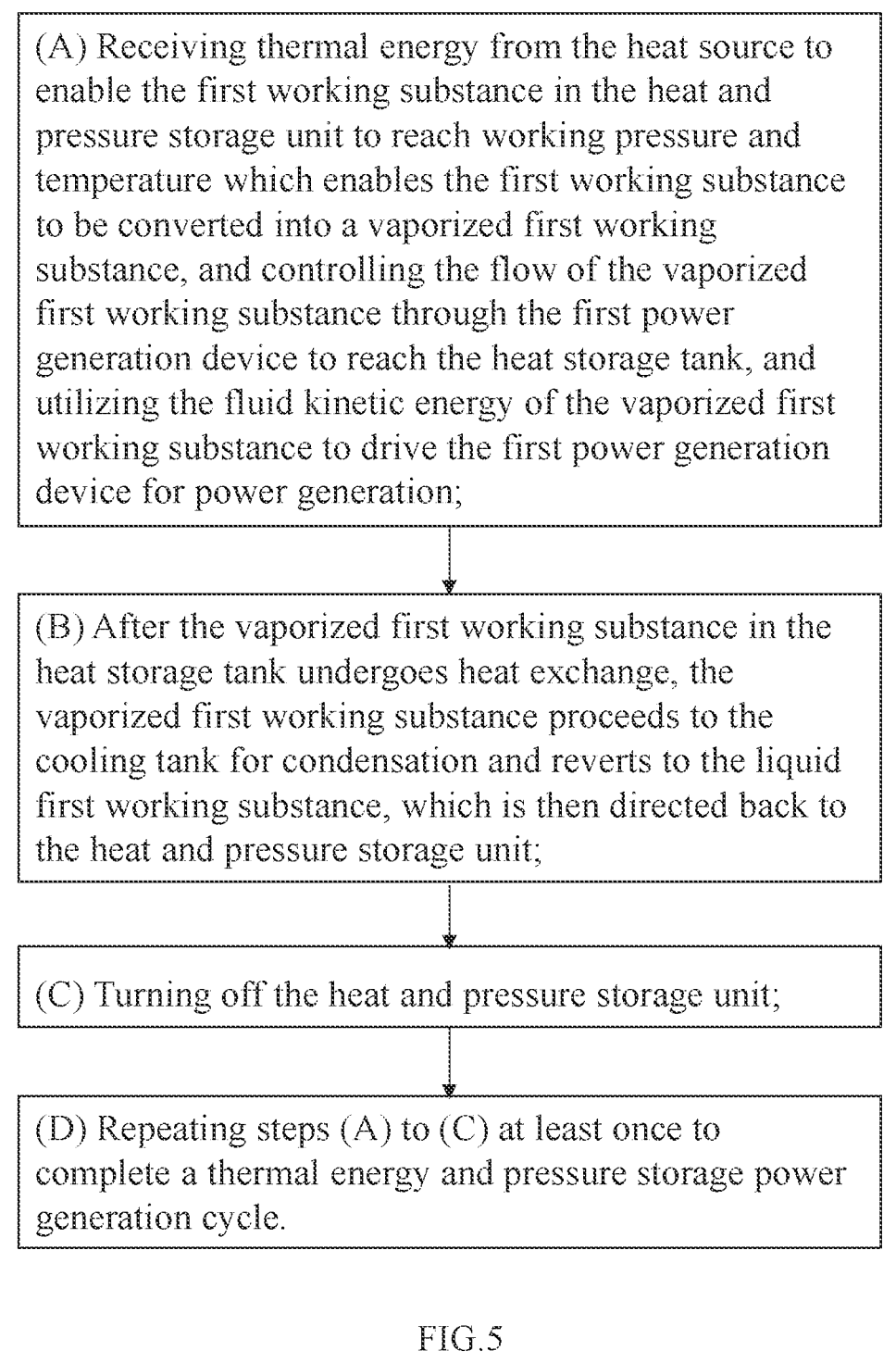

(B) After the vaporized first working substance in the heat storage tank undergoes heat exchange, the vaporized first working substance proceeds to the cooling tank for condensation and reverts to the liquid first working substance, which is then directed back to the heat and pressure storage unit;

↓

(C) Turning off the heat and pressure storage unit;

↓

(D) Repeating steps (A) to (C) at least once to complete a thermal energy and pressure storage power generation cycle.

FIG.5

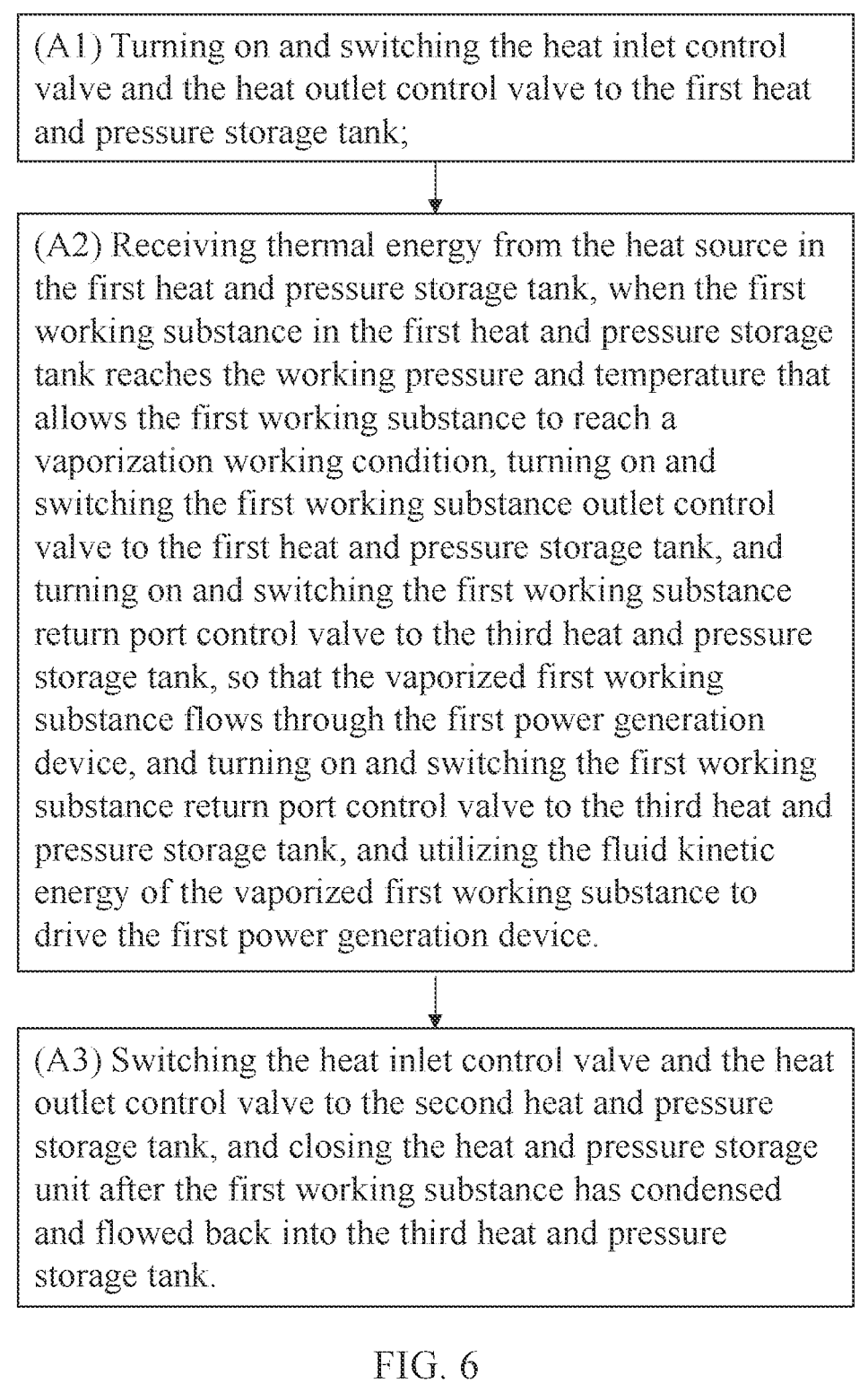

(A1) Turning on and switching the heat inlet control valve and the heat outlet control valve to the first heat and pressure storage tank;

(A2) Receiving thermal energy from the heat source in the first heat and pressure storage tank, when the first working substance in the first heat and pressure storage tank reaches the working pressure and temperature that allows the first working substance to reach a vaporization working condition, turning on and switching the first working substance outlet control valve to the first heat and pressure storage tank, and turning on and switching the first working substance return port control valve to the third heat and pressure storage tank, so that the vaporized first working substance flows through the first power generation device, and turning on and switching the first working substance return port control valve to the third heat and pressure storage tank, and utilizing the fluid kinetic energy of the vaporized first working substance to drive the first power generation device.

(A3) Switching the heat inlet control valve and the heat outlet control valve to the second heat and pressure storage tank, and closing the heat and pressure storage unit after the first working substance has condensed and flowed back into the third heat and pressure storage tank.

FIG. 6

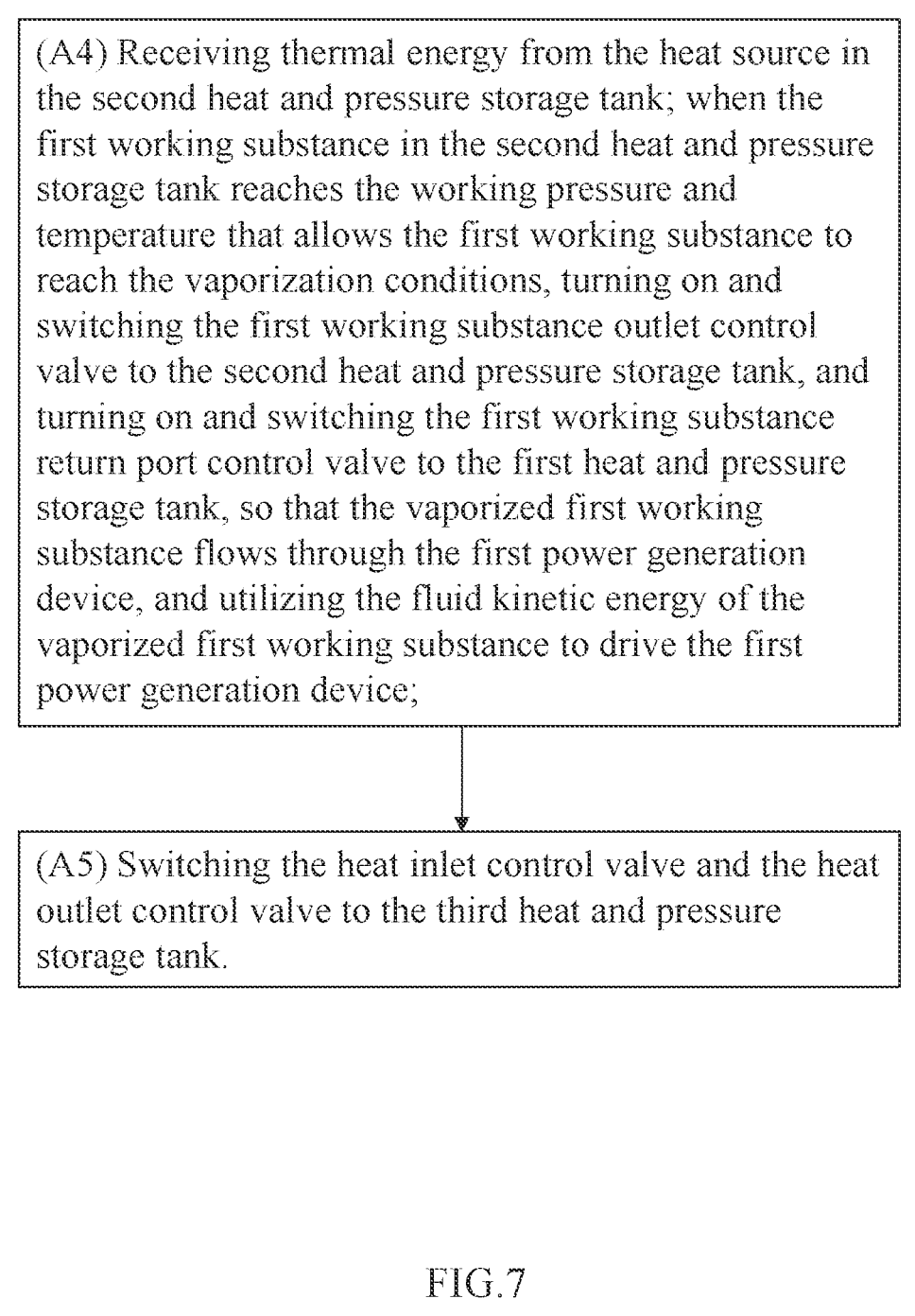

(A4) Receiving thermal energy from the heat source in the second heat and pressure storage tank; when the first working substance in the second heat and pressure storage tank reaches the working pressure and temperature that allows the first working substance to reach the vaporization conditions, turning on and switching the first working substance outlet control valve to the second heat and pressure storage tank, and turning on and switching the first working substance return port control valve to the first heat and pressure storage tank, so that the vaporized first working substance flows through the first power generation device, and utilizing the fluid kinetic energy of the vaporized first working substance to drive the first power generation device;

(A5) Switching the heat inlet control valve and the heat outlet control valve to the third heat and pressure storage tank.

FIG.7

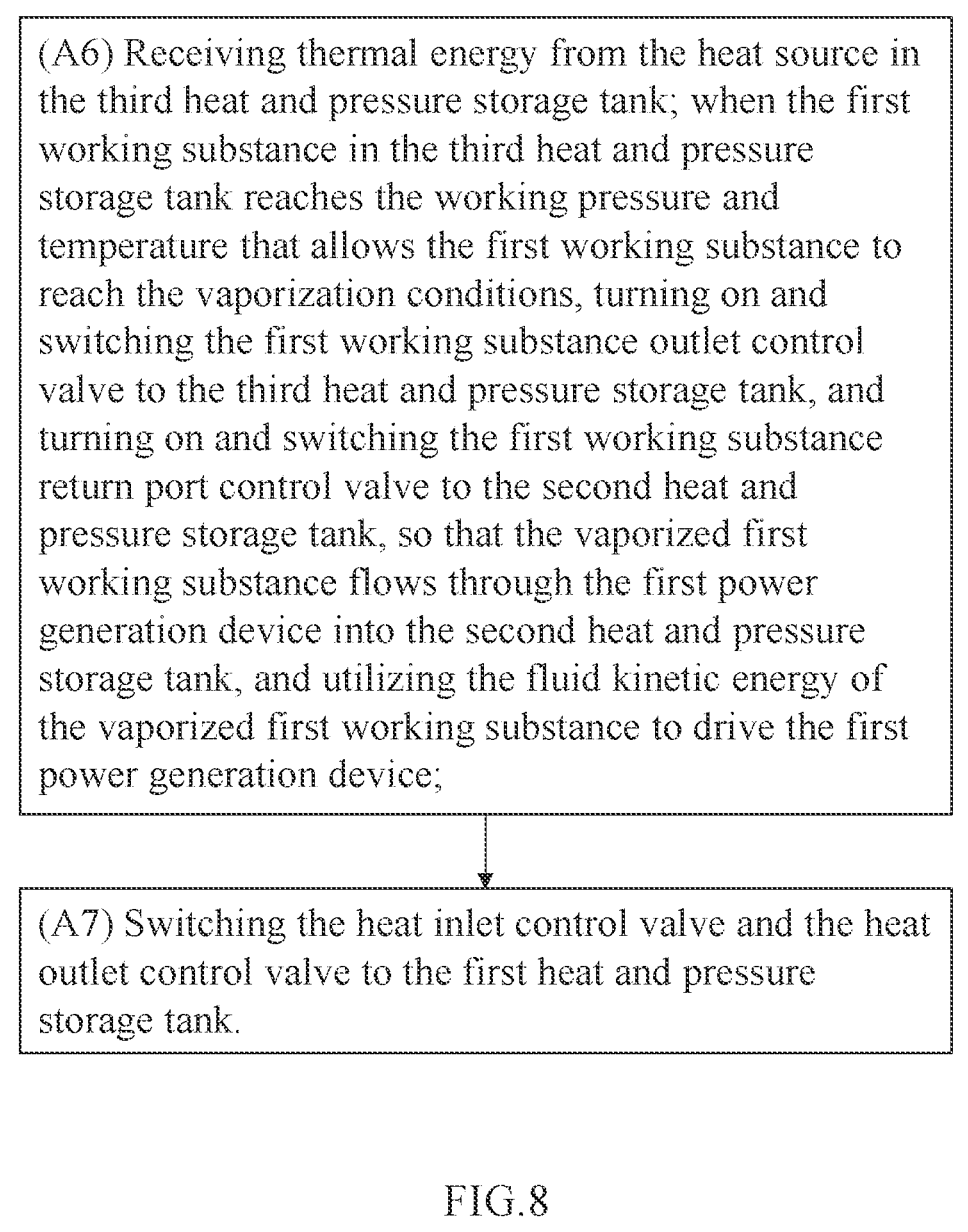

(A6) Receiving thermal energy from the heat source in the third heat and pressure storage tank; when the first working substance in the third heat and pressure storage tank reaches the working pressure and temperature that allows the first working substance to reach the vaporization conditions, turning on and switching the first working substance outlet control valve to the third heat and pressure storage tank, and turning on and switching the first working substance return port control valve to the second heat and pressure storage tank, so that the vaporized first working substance flows through the first power generation device into the second heat and pressure storage tank, and utilizing the fluid kinetic energy of the vaporized first working substance to drive the first power generation device;

(A7) Switching the heat inlet control valve and the heat outlet control valve to the first heat and pressure storage tank.

FIG.8

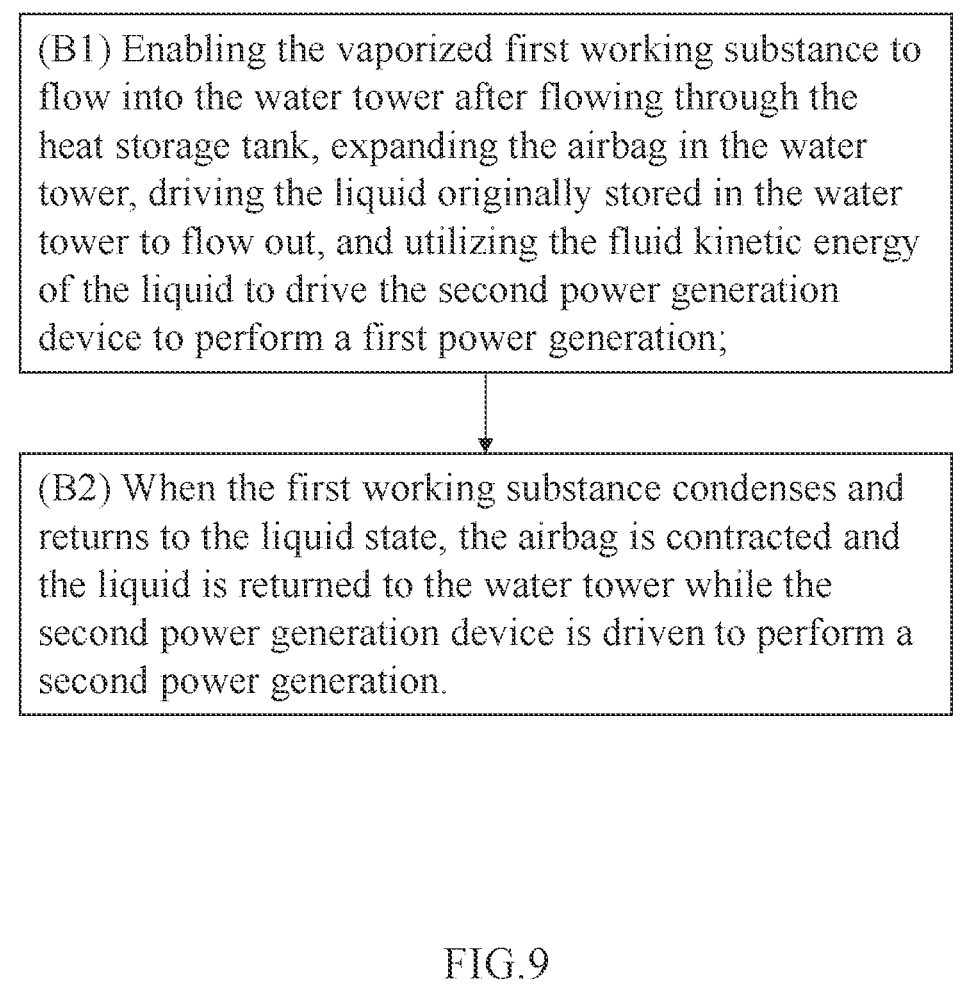

(B1) Enabling the vaporized first working substance to flow into the water tower after flowing through the heat storage tank, expanding the airbag in the water tower, driving the liquid originally stored in the water tower to flow out, and utilizing the fluid kinetic energy of the liquid to drive the second power generation device to perform a first power generation;

(B2) When the first working substance condenses and returns to the liquid state, the airbag is contracted and the liquid is returned to the water tower while the second power generation device is driven to perform a second power generation.

FIG.9

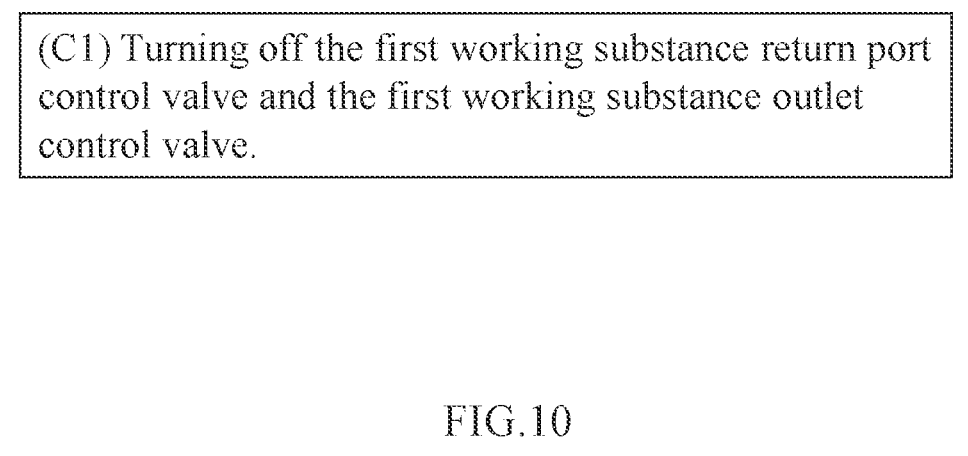

(C1) Turning off the first working substance return port control valve and the first working substance outlet control valve.

FIG.10

INTEGRATED POWER GENERATION SYSTEM WITH THERMAL ENERGY AND PRESSURE STORAGE CYCLES AND CONTROLLING METHOD THEREOF

This application claims priority to a patent application entitled "Integrated Power Generation System with Thermal Energy and Pressure Storage Cycles and Controlling Method Thereof", which was filed with the Chinese Patent Office on Jul. 19, 2021, under application No. 202110811850.X, and the entire contents of which are incorporated herein by reference.

FIELD OF INVENTION

The present application relates to an integrated power generation system with thermal energy and pressure storage cycles for converting thermal energy into electrical energy.

BACKGROUND OF THE INVENTION

Taiwan Patent Publication No. TW202037860, filed by the applicant, discloses a heat pipe electric water heater comprising: at least one heat pipe for providing fluid pipelines, heat conduction, and combination with other devices for a working substance. At least one first power generation device is provided between the fluid pipelines of the heat pipe to convert the fluid kinetic energy of the working substance into electrical energy. At least one heat and pressure storage unit is used to carry out heat exchange with a heat-conductive section of the heat pipe and to store the thermal energy for supplying hot water.

Prior art utilizes solar energy, waste heat from electrical appliances, or small temperature differences to generate and store heat. However, the original structural design of the heat pipe is limited in terms of the pressure it can withstand, thus limiting the choice of working substances as well as the efficiency of power generation.

SUMMARY OF THE INVENTION

The technical problem to be solved in this application is to provide an integrated power generation system with thermal energy and pressure storage cycles, comprising a heat and pressure storage unit connected to a heat source, the thermal energy of the heat source is transmitted to the heat and pressure storage unit to enable a first working substance in the heat and pressure storage unit to be heated up and pressurized into a gaseous state; a first power generation device receives the high-temperature and high-pressure first working substance released from the heat and pressure storage unit and converts the fluid kinetic energy of the first working substance into electrical energy; a heat storage tank receives the first working substance flowing through the first power generation device and stores the thermal energy generated during the heat exchange of the first working substance; and a cooling tank receives the first working substance from the heat storage tank, enables the first working substance to undergo a phase change and then transmits the first working substance to the heat and pressure storage unit to complete a cycle.

Wherein, the inside of the heat storage tank has multiple heat exchangers, which are used to increase the surface area and accelerate the heat exchange rate, and allow the first working substance to flow in for heat exchange. The heat storage tank contains a high-temperature layer, an intermediate-temperature layer, and a low-temperature layer. These layers act as effective insulation, reducing thermal diffusion and maintaining high temperatures within the high-temperature layer. Simultaneously, the first working substance in the heat storage tank undergoes heat exchange, flows to the cooling tank, and then returns to the heat and pressure storage unit.

Wherein, there is also a second working substance that is used to pressurize or depressurize the first working substance in the liquid state, i.e., the pressure generated by the second working substance is used to control the temperature point at which the first working substance undergoes the phase change.

Preferably, a multi-level temperature control valve is provided between the first power generation device and the heat storage tank. When the first working substance flows through the first power generation device to generate electricity and then flows through the multi-level temperature control valve, which controls the flow of the first working substance into the high-temperature layer or the intermediate-layer and the low-temperature layer for heat exchange based on the residual heat temperature of the first working substance after the generation of electricity, thus maintaining the temperature of the high-temperature layer for the benefit of maintaining the energy storage and for the benefit of nighttime power generation.

Preferably, a circulation return pipe is also provided between the first power generation device and the multi-level temperature control valve, which facilitates continuous operation of the first power generation device with flywheel blades.

Preferably, a heater is also provided in the heat storage tank to utilize the lower-priced off-peak power or excess green power to conduct a high-temperature heat storage, and the stored thermal energy is used to generate electricity during the higher-priced on-peak hours to balance the electric grid and achieve profitability.

Wherein, the heat and pressure storage unit is also provided with multiple control valves, namely a heat inlet control valve, a heat outlet control valve, a first working substance return port control valve, and a first working substance outlet control valve, respectively, which are used to control the thermal energy and the first working substance into and out of a first heat and pressure storage tank, a second heat and pressure storage tank, and a third heat and pressure storage tank of the heat and pressure storage unit.

Preferably, within two of the heat and pressure storage tanks in the heat and pressure storage unit, the first working substance is stored in its liquid state. This design minimizes the waiting time required for the first working substance to heat up and the heat and pressure storage tanks to cool down, thereby significantly enhancing the power generation efficiency.

Preferably, in this application, a working substance adjusting device is also provided between the heat and pressure storage unit and the first power generation device or the cooling tank. When a change in the external ambient temperature is detected, the system basic pressure maintained by the second working substance will be adjusted to change the condensation temperature of the first working substance to enhance circulation efficiency.

Preferably, in this application, a liquid-level detector is also provided within the heat storage tank. When the first working substance is detected to be insufficient, the working substance adjusting device will be turned on to supplement the first working substance to allow the first working substance to flow for thermal cycling.

Furthermore, a water tower is provided between the heat storage tank and the cooling tank, an airbag is provided in the water tower, and a second power generation device is provided between the water tower and the cooling tank. When the first working substance flows into the water tower to expand the airbag, the liquid originally stored in the water tower will flow out and drive the second power generation device accordingly, and when the first working substance condenses and flows out, the airbag will be contracted and the liquid will return to the water tower and simultaneously drive the second power generation device again, thereby generating power in a more efficient manner.

This application further comprises a method of controlling the integrated power generation system with thermal energy and pressure storage cycles comprising the following steps of:

(A) turning on the heat and pressure storage unit and receiving thermal energy from the heat source to enable the first working substance in the heat and pressure storage unit to reach working pressure and temperature, which enables the first working substance to be converted into a vaporized first working substance, and controlling the flow of the vaporized first working substance through the first power generation device to reach the heat storage tank, and utilizing the fluid kinetic energy of the vaporized first working substance to drive the first power generation device for power generation;

(B) after the vaporized first working substance in the heat storage tank undergoes heat exchange, the vaporized first working substance proceeds to the cooling tank for condensation and reverts to the liquid first working substance, which is then directed back to the heat and pressure storage unit;

(C) turning off the heat and pressure storage unit; and (D) repeating steps (A) to (C) at least once to complete a thermal energy and pressure storage power generation cycle.

Preferably, step (A) further comprises the following steps of:

(A1) turning on and switching the heat inlet control valve and the heat outlet control valve to the first heat and pressure storage tank;

(A2) receiving thermal energy from the heat source in the first heat and pressure storage tank. When the first working substance in the first heat and pressure storage tank reaches the working pressure and temperature that allows the first working substance to reach a vaporization working condition, turning on and switching the first working substance outlet control valve to the first heat and pressure storage tank, and turning on and switching the first working substance return port control valve to the third heat and pressure storage tank, so that the vaporized first working substance flows through the first power generation device and the fluid kinetic energy of the vaporized first working substance is utilized to drive the first power generation device; and (A3) switching the heat inlet control valve and the heat outlet control valve to the second heat and pressure storage tank.

Preferably, step (B) further comprises the following steps of:

(B1) enabling the vaporized first working substance to flow into the water tower after flowing through the heat storage tank, expanding the airbag in the water tower, driving the liquid originally stored in the water tower to flow out, and utilizing the fluid kinetic energy of the liquid to drive the second power generation device to perform a first power generation; and (B2) when the first working substance condenses and returns to the liquid state, the airbag is contracted and the liquid is returned to the water tower while the second power generation device is driven to perform a second power generation.

Details of other effects and embodiments of this application are described below in conjunction with the drawings.

BRIEF DESCRIPTION OF THE DRAWINGS

In order to more clearly illustrate the technical solutions in the embodiments or prior art of this application, the following will briefly introduce the accompanying drawings to be used in the description of the embodiments or prior art, and it is obvious that the accompanying drawings in the following description are only some of the embodiments described in this application, and for those of ordinary skill in the art, other accompanying drawings might be obtained according to these embodiments without any creative labor.

FIG. 5 is a schematic diagram of the thermal cycle power generation steps of this application;

FIGS. 6 to 8 are steps A1 to A7 of this application;

FIG. 9 is steps B1 to B2 of this application;

FIG. 10 is step C1 of this application.

DESCRIPTION OF REFERENCE NUMBER

Figure 1:
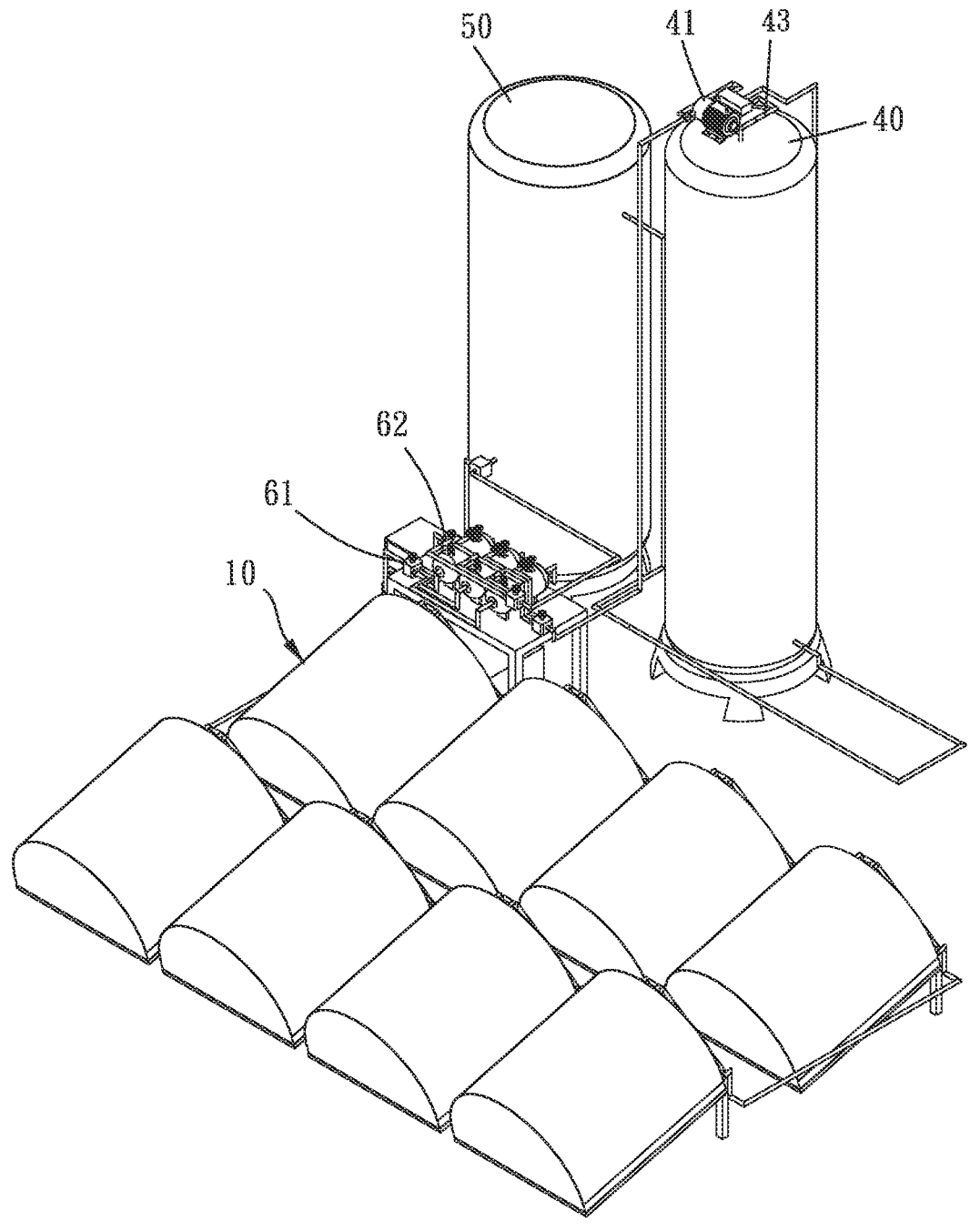
FIG. 1 is a schematic diagram of one embodiment of this application.

A~D: Step
A1~A7: Step
B1~B2: Step
C1: Step
10: Heat source
20: Heat and pressure storage unit
21: First heat and pressure storage tank
22: Second heat and pressure storage tank
23: Third heat and pressure storage tank
30: Water tower
31: Second power generation device
32: Airbag
40: Heat storage tank
401: High-temperature layer
402: Intermediate-temperature layer
403: Low-temperature layer
41: First power generation device
42: Multi-level temperature control valve
43: Circulation return pipe
44: Heat exchanger
46: Heater
50: Cooling tank
61: Heat inlet control valve
62: Heat outlet control valve
63: First working substance outlet control valve
64: First working substance return port control valve

DETAILED DESCRIPTION OF THE PREFERRED EMBODIMENTS

The positional relationships described in the following embodiments include: up, down, left, and right, unless otherwise indicated, are based on the orientation of the components as shown in the drawings.

Referring to FIGS. 1 to 4, depicted herein is an integrated power generation system with thermal energy and pressure storage cycles, comprising a heat and pressure storage unit 20 connected to a heat source 10, the thermal energy of the heat source 10 is transmitted to the heat and pressure storage unit 20 to enable a first working substance in the heat and pressure storage unit 20 to be heated up and pressurized into a gaseous state when released; a first power generation device 41 receives the high-temperature and high-pressure first working substance released from the heat and pressure storage unit 20 and converts the fluid kinetic energy of the first working substance into electrical energy; a heat storage tank 40 receives the first working substance flowing through the first power generation device 41 and exchanges heat with the first working substance to store the thermal energy; and a cooling tank 50 receives the first working substance from the heat storage tank 40 and enables the first working substance to undergo a phase change into a liquid state and then transmits the first working substance to the heat and pressure storage unit 20 to complete a cycle. Wherein the heat source 10 may be waste heat from the process, heat from solar energy collection, or other heat source.

Wherein, the heat storage tank 40 or the cooling tank 50 also contains internally a second working substance that fills a space other than the liquid first working substance and which is used to pressurize or depressurize the liquid first working substance, i.e., to control the temperature point at which the phase change of the first working substance is performed, by utilizing the pressure generated by the second working substance.

Figure 2:
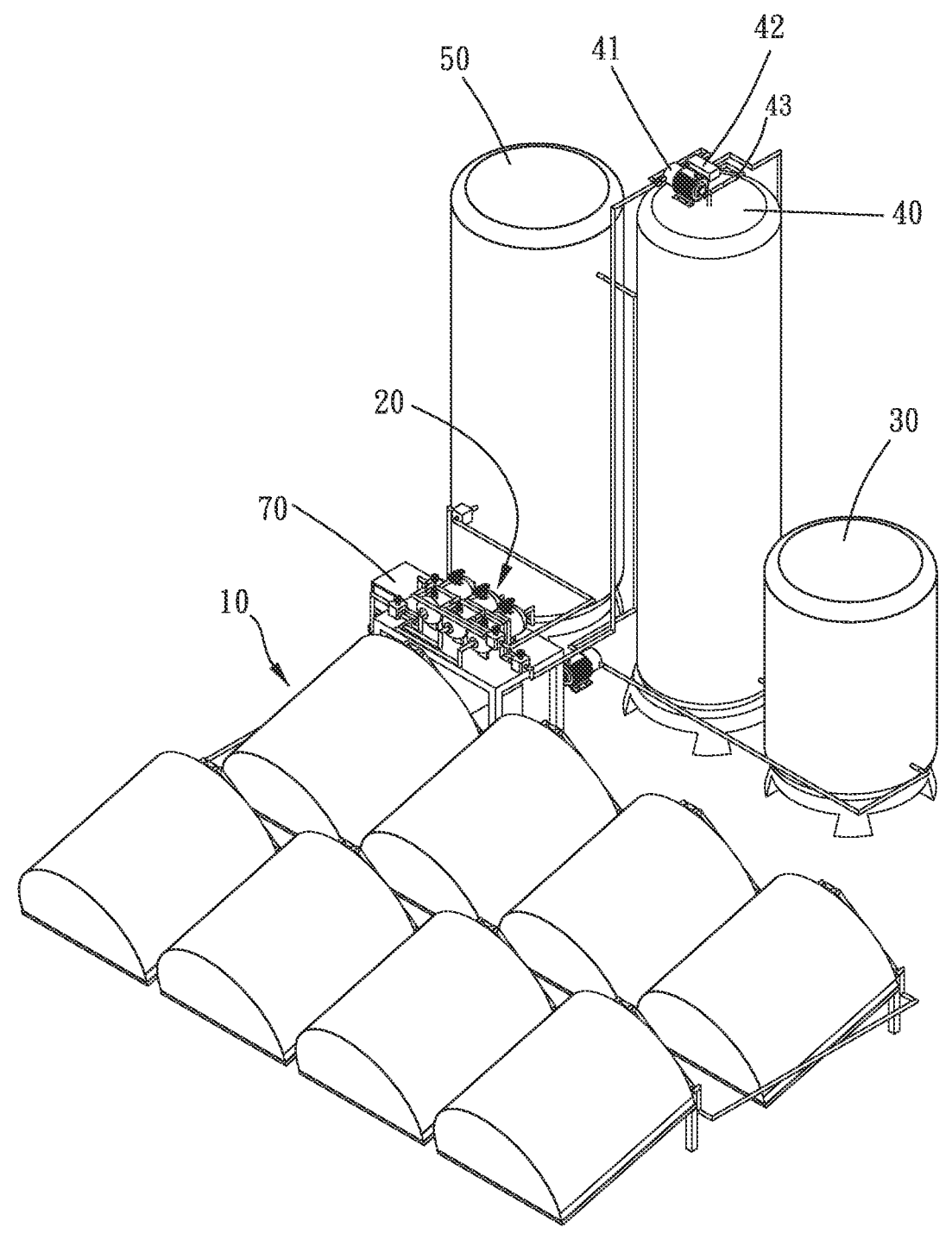
FIG. 2 is a schematic diagram of another embodiment of this application.

Referring to FIG. 2, a water tower 30 is also provided between the heat storage tank 40 and the cooling tank 50, an airbag 32 is provided in the water tower 30, and a second power generation device 31 is provided between the water tower 30 and the cooling tank 50. When the first working substance flows into the water tower 30 to expand the airbag 32, the liquid originally stored in the water tower 30 will flow out and drive the second power generation device 31 accordingly, and when the first working substance condenses and flows out, the airbag 32 is contracted and the liquid will return to the water tower 30 and simultaneously drive the second power generation device 31 again, thereby generating power in a more efficient manner. In this embodiment, the second power generation device 31 is a water turbine generator.

Figure 3:
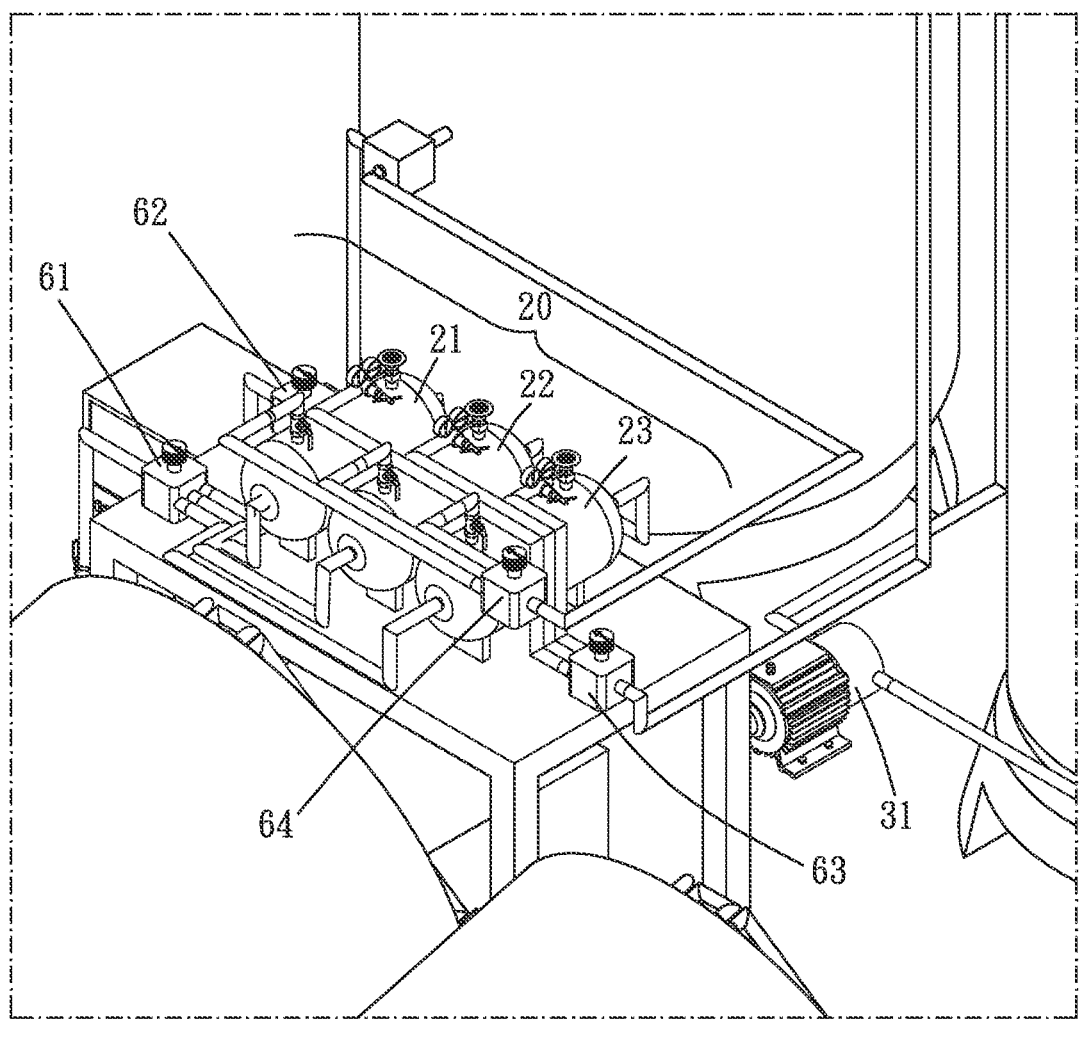
FIG. 3 is a schematic diagram of a heat and pressure storage unit of this application.

Referring to FIG. 3, this application also provides multiple control valves in the heat and pressure storage unit 20 comprising a first heat and pressure storage tank 21, a second heat and pressure storage tank 22, and a third heat and pressure storage tank 23, in which the control valves are a heat inlet control valve 61, a heat outlet control valve 62, a first working substance return port control valve 64, and a first working substance outlet control valve 63, respectively. These control valves are used to control the thermal energy and the first working substance into and out of these heat and pressure storage tanks.

In actual use, two of the heat and pressure storage tanks internally store the first working substance, and the other is an empty tank. When the first working substance is vaporized in one of the heat and pressure storage tanks and flows through the first power generation device 41, the heat storage tank 40, the water tower 30, and the cooling tank 50, it will be stored in the empty tank, so that the heat and pressure storage tank originally storing the first working substance becomes an empty tank which will be used as a heat and pressure storage tank for storing the first working substance in the next cycle. As a result, the waiting time for the first working substance to be heated up and the heat and pressure storage tank to be cooled down can be minimized, thereby significantly enhancing the power generation efficiency.

Figure 4:
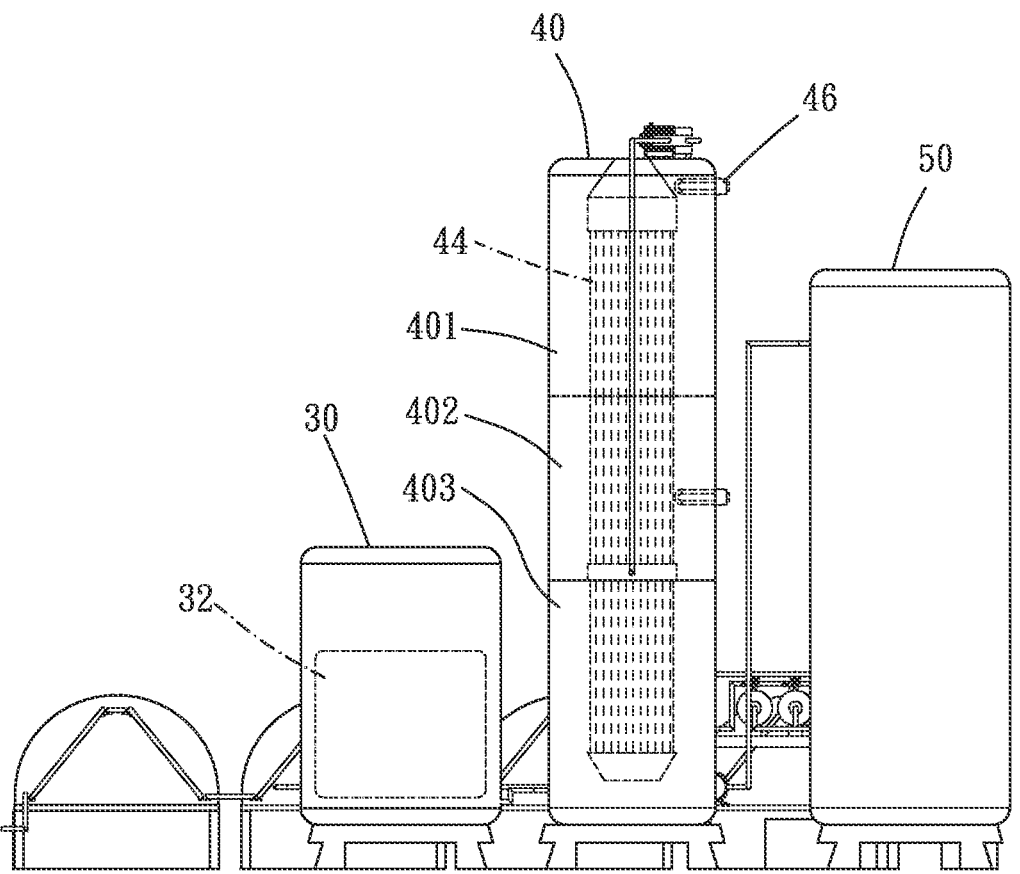
FIG. 4 is a cross-sectional view of this application.

Referring to FIG. 4, the heat storage tank 40 comprises a high-temperature layer 401, an intermediate-temperature layer 402, and a low-temperature layer 403. The division of the heat storage tank 40 into the high-temperature layer 401, the intermediate-temperature layer 402, and the low-temperature layer 403. These layers act as effective insulation, therefore reducing thermal diffusion of stored thermal energy. As the first working substance flows through the heat storage tank 40, it participates in the heat exchange within the heat storage tank 40, enabling the preservation of its residual temperature within the heat storage tank 40 and facilitating nighttime utilization or serving as a backup power source.

In other embodiments, for the purpose of balancing the electric grid and taking advantage of the electricity price differential, two heaters 46 are provided in the heat storage tank 40 at the high-temperature layer 401 and the intermediate-temperature layer 402, respectively, to utilize the lower-priced off-peak power or excess green power for high-temperature heat storage. At the same time, in the higher-priced on-peak hours, the stored thermal energy can be used to generate electricity to balance the electric grid and achieve profitability.

In this embodiment, a multi-level temperature control valve 42 is also provided between the first power generation device 41 and the heat storage tank 40. When the first working substance flows through the first power generation device 41 to generate electricity and then flows through the multi-level temperature control valve 42, which controls the flow of the first working substance into the high-temperature layer 401 or the intermediate- and low-temperature layers 402, 403 for heat exchange based on the residual heat temperature of the first working substance after the generation of electricity, thus maintaining the temperature of the high-temperature layer 401 for the benefit of maintaining the energy storage and for the benefit of nighttime power generation.

Wherein, a circulation return pipe 43 is also provided between the first power generation device 41 and the multi-level temperature control valve 42, which facilitates continuous operation of the first power generation device 41 with flywheel blades.

The first working substance undergoes heat exchange in the heat storage tank 40 and then flows into the cooling tank 50, which enables the first working substance to condense to the liquid state, and then the first working substance flows back to the heat and pressure storage unit 20. In this embodiment, multiple heat exchangers 44 are provided within the heat storage tank 40 to increase the surface area and accelerate the heat exchange rate.

In this embodiment, a working substance adjusting device 70 is also provided between the heat and pressure storage unit 20 and the first power generation device 41 or the cooling tank 50. A liquid-level detector (not shown) is provided within the heat storage tank 40, and when the liquid-level detector detects that the first working substance is insufficient, the working substance adjusting device 70 will be turned on to supplement the first working substance. Or, when a change in the external ambient temperature is detected, the working substance adjusting device 70 will adjust the second working substance to maintain the basic pressure of the system and change the condensation temperature of the first working substance to enhance circulation efficiency.

Referring to FIGS. 5 to 10, this application also provides a method of controlling the integrated thermoelectric generation system with thermal energy and pressure storage cycles, comprising the steps of:

(A) transmitting the thermal energy of the heat source 10 to the heat and pressure storage unit 20 to enable the first working substance in the heat and pressure storage unit 20 to reach a working pressure and temperature and the working conditions of the vaporization, and then converting the first working substance into a vaporized first working substance, and controlling the flow of the vaporized first working substance through the first power generation device 41 to the heat storage tank 40, and driving the first power generation device 41 to generate electricity by utilizing the fluid kinetic energy of the vaporized first working substance;

(B) after the vaporized first working substance in the heat storage tank undergoes heat exchange, the vaporized first working substance proceeds to the cooling tank 50 for condensation and reverts to a liquid first working substance, which is then directed back to the heat and pressure storage unit 20;

(C) turning off the heat and pressure storage unit 20; and (D) repeating steps (A) to (C) at least once to complete a thermal energy and pressure storage power generation cycle.

In this embodiment, steps A1 to A7, steps B1 to B3, and step C1 are incorporated to form a more efficient power generation cycle, wherein the steps of the thermal energy and pressure storage power generation cycle are as follows:

(A1) turning on the heat inlet control valve 61 and the heat outlet control valve 62 and switching to the first heat and pressure storage tank 21; at this time, the first heat and pressure storage tank 21 and the second heat and pressure storage tank 22 have already stored the liquid first working substance in them, and the third heat and pressure storage tank 23 is empty;

(A2) receiving thermal energy from the heat source 10 in the first heat and pressure storage tank 21; when the first working substance in the first heat and pressure storage tank 21 reaches the working pressure and temperature that allows the first working substance to reach the vaporization conditions, turning on and switching the first working substance outlet control valve 63 to the first heat and pressure storage tank 21, and turning on and switching the first working substance return port control valve 64 to the third heat and pressure storage tank 23, so that the vaporized first working substance flows through the first power generation device 41, and utilizing the fluid kinetic energy of the vaporized first working substance to drive the first power generation device 41;

(A3) switching the heat inlet control valve 61 and the heat outlet control valve 62 to the second heat and pressure storage tank 22;

(B1) after the vaporized first working substance flows through the heat storage tank 40 and exchanges the residual heat to the high-temperature layer 401, the intermediate-temperature layer 402, and the low-temperature layer 403, or the intermediate-temperature layer 402 and the low-temperature layer 403 of the heat storage tank 40 and flows into the water tower 30, so that the airbag 32 in the water tower 30 will be expanded to cause the liquid originally stored in the water tower 30 to flow out, and the fluid kinetic energy of the liquid will be used to drive the second power generation device 31 to perform a first power generation;

(B2) after the vaporized first working substance flows into the cooling tank 50, the vaporized first working substance condenses and returns to the liquid state and flows back to the third heat and pressure storage tank 23, and when the first working substance condenses and returns to the liquid state, the airbag 32 will be contracted and the liquid will flow back to the water tower and simultaneously drive the second power generation device 31 to perform a second power generation to form a first batch of the power generation process, at which time the third heat and pressure storage tank 23 has stored the liquid first working substance and the first heat and pressure storage tank 21 is empty;

(C1) turning off the first working substance return port control valve 64 and the first working substance outlet control valve 63;

(A4) receiving thermal energy from the heat source 10 in the second heat and pressure storage tank 22; when the first working substance in the second heat and pressure storage tank 22 reaches the working pressure and temperature that allows the first working substance to reach the vaporization conditions, turning on and switching the first working substance outlet control valve 63 to the second heat and pressure storage tank 22, and turning on and switching the first working substance return port control valve 64 to the first heat and pressure storage tank 21, so that the vaporized first working substance flows through the first power generation device 41, and utilizing the fluid kinetic energy of the vaporized first working substance to drive the first power generation device 41;

(A5) switching the heat inlet control valve 61 and the heat outlet control valve 62 to the third heat and pressure storage tank 23;

(B1) after the vaporized first working substance flows through the heat storage tank 40 and exchanges the residual heat to the high-temperature layer 401, the intermediate-temperature layer 402, and the low-temperature layer 403, or the intermediate-temperature layer 402 and the low-temperature layer 403 of the heat storage tank 40 and flows into the water tower 30, so that the airbag 32 in the water tower 30 will be expanded to cause the liquid originally stored in the water tower 30 to flow out, and the fluid kinetic energy of the liquid will be used to drive the second power generation device 31;

(B2) after the vaporized first working substance flows into the cooling tank 50, the vaporized first working substance condenses and returns to the liquid state and flows back to the first heat and pressure storage tank 21, and when the first working substance condenses and returns to the liquid state, the airbag 32 will be contracted and the liquid will flow back to the water tower 30 and simultaneously drive the second power generation device 31 to perform the second power generation to form a second batch of the power generation process, at which time the first heat and pressure storage tank 21 has stored the liquid first working substance and the second heat and pressure storage tank 22 is empty;

(C1) turning off the first working substance return port control valve 64 and the first working substance outlet control valve 63;

(A6) receiving thermal energy from the heat source 10 in the third heat and pressure storage tank 23; when the first working substance in the third heat and pressure storage tank 23 reaches the working pressure and temperature that allows the first working substance to reach the vaporization conditions, turning on and switching the first working substance outlet control valve 63 to the third heat and pressure storage tank 23, and turning on and switching the first working substance return port control valve 64 to the second heat and pressure storage tank 22, so that the vaporized first working substance flows through the first power generation device 41 into the second heat and pressure storage tank 22, and utilizing the fluid kinetic energy of the vaporized first working substance to drive the first power generation device 41;

(A7) switching the heat inlet control valve 61 and the heat outlet control valve 62 to the first heat and pressure storage tank 21;

(B1) after the vaporized first working substance flows through the heat storage tank 40 and exchanges the residual heat to the high-temperature layer 401, the intermediate-temperature layer 402, and the low-temperature layer 403, or the intermediate-temperature layer 402 and the low-temperature layer 403 of the heat storage tank 40 and flows into the water tower 30, so that the airbag 32 in the water tower 30 will be expanded to cause the liquid originally stored in the water tower 30 to flow out, and the fluid kinetic energy of the liquid will be used to drive the second power generation device 31;

(B2) after the vaporized first working substance flows into the cooling tank 50, the vaporized first working substance condenses and returns to the liquid state and flows back to the second heat and pressure storage tank 22, and when the first working substance condenses and returns to the liquid state, the airbag 32 will be contracted and the liquid will flow back to the water tower 30 and simultaneously drive the second power generation device 31 to perform the second power generation to form a third batch of the power generation process, at which time the second heat and pressure storage tank 22 has stored the liquid first working substance and the third heat and pressure storage tank 23 is empty;

(C1) turning off the first working substance return port control valve 64 and the first working substance outlet control valve 63; and (D) repeating the above steps (A1) to (C1) for one thermal energy and pressure storage power generation cycle.

The above embodiments and/or implementations are used only to illustrate the preferred embodiments and/or implementations for implementing the technology of this application and are not intended to impose any formal limitations on implementations of the technology of this application, and any person skilled in the art may, without departing from the scope of the technical means disclosed herein, make some changes or modifications to the other equivalent embodiments, which shall be considered to be the same technology or embodiments as those of this application.

What is claimed is:

1. An integrated power generation system with thermal energy and pressure storage cycles, comprising:

a heat and pressure storage unit, which is connected to a heat source, the thermal energy of the heat source is transmitted to the heat and pressure storage unit to enable a first working substance in the heat and pressure storage unit to be heated up and pressurized into a gaseous state when released;

a first power generation device, which receives the high-temperature and high-pressure first working substance released from the heat and pressure storage unit and converts the fluid kinetic energy of the first working substance into electrical energy;

a heat storage tank, which receives the first working substance flowing through the first power generation device and exchanges heat with the first working substance to store the thermal energy; and a cooling tank, which receives the first working substance from the heat storage tank and the first working substance undergoes a phase change, then transmits the first working substance to the heat and pressure storage unit, wherein multiple control valves are provided in the heat and pressure storage unit, and wherein the heat and pressure storage unit comprises a first heat and pressure storage tank, a second heat and pressure storage tank, and a third heat and pressure storage tank, and the control valves are used to control the thermal energy and the first working substance into and out of these heat and pressure storage tanks.

2. The integrated power generation system with thermal energy and pressure storage cycles according to claim 1, wherein the heat storage tank and/or the cooling tank also contains a second working substance that is used to pressurize or depressurize the first working substance in the liquid state.

3. The integrated power generation system with thermal energy and pressure storage cycles according to claim 1, wherein the inside of the heat storage tank has multiple heat exchangers.

4. The integrated power generation system with thermal energy and pressure storage cycles according to claim 3, wherein a multi-level temperature control valve is provided between the first power generation device and the heat storage tank.

5. The integrated power generation system with thermal energy and pressure storage cycles according to claim 4, wherein a circulation return pipe is provided between the first power generation device and the multi-level temperature control valve.

6. The integrated power generation system with thermal energy and pressure storage cycles according to claim 1, wherein the heat storage tank comprises a high-temperature layer, an intermediate-temperature layer, and a low-temperature layer.

7. The integrated power generation system with thermal energy and pressure storage cycles according to claim 1, wherein at least one heater is provided within the heat storage tank.

8. The integrated power generation system with thermal energy and pressure storage cycles according to claim 1, wherein two of the heat and pressure storage tanks internally store the liquid first working substance.

9. The integrated power generation system with thermal energy and pressure storage cycles according to claim 1, wherein at least one working substance adjusting device is also provided between the heat and pressure storage unit and the first power generation device or the cooling tank.

10. The integrated power generation system with thermal energy and pressure storage cycles according to claim 1, wherein a water tower is also provided between the heat storage tank and the cooling tank.

11. The integrated power generation system with thermal energy and pressure storage cycles according to claim 10, wherein a second power generation device is provided between the water tower and the cooling tank, the second power generation device is a water turbine generator.

12. The integrated power generation system with thermal energy and pressure storage cycles according to claim 11, wherein an airbag is provided in the water tower.

* * * * *